(12) United States Patent
Yang

(10) Patent No.: US 7,249,380 B2
(45) Date of Patent: Jul. 24, 2007

(54) METHOD AND APPARATUS FOR EVALUATING TRUST AND TRANSITIVITY OF TRUST OF ONLINE SERVICES

(76) Inventor: Yinan Yang, P.O. Box 371, Dickson ACT 2602 (AU)

( * ) Notice: Subject to any disclaimer, the term of this patent is extended or adjusted under 35 U.S.C. 154(b) by 711 days.

(21) Appl. No.: 10/655,982

(22) Filed: Sep. 5, 2003

(65) Prior Publication Data

US 2004/0064335 A1 Apr. 1, 2004

Related U.S. Application Data

(60) Provisional application No. 60/408,548, filed on Sep. 5, 2002.

(51) Int. Cl.
*G06F 11/00* (2006.01)
(52) U.S. Cl. .................. 726/25; 713/156; 713/175
(58) Field of Classification Search ............ 726/21–25, 726/1; 713/156, 175; 709/203, 224; 705/50, 705/1; 707/2, 10; 715/500, 760
See application file for complete search history.

(56) References Cited

U.S. PATENT DOCUMENTS

| | | | | |
|---|---|---|---|---|
| 5,835,905 A | * | 11/1998 | Pirolli et al. ................... 707/3 |
| 6,266,664 B1 | * | 7/2001 | Russell-Falla et al. ......... 707/5 |
| 6,360,235 B1 | * | 3/2002 | Tilt et al. ................ 715/501.1 |
| 6,606,659 B1 | * | 8/2003 | Hegli et al. ................. 709/225 |
| 6,978,266 B2 | * | 12/2005 | Larason et al. ................ 707/5 |
| 2002/0124172 A1 | * | 9/2002 | Manahan ................... 713/176 |

OTHER PUBLICATIONS

Y. Yang, L. Brown, J. Newmarch and E. Lewis, eCommerce Trust via the Proposed W3 Trust Model, the PACCS01 Conference Proceedings, p. 9-14, Jul. 2001, Australia.

Y. Yang, L. Brown, J. Newmarch and E. Lewis, A Trusted W3 Model: Transitivity of Trust in a Heterogeneous Web Environment, the Fifth Australian World Wide Web Conference Proceedings, p. 59-73, Apr. 18-20, 1999.

Y. Yang, L. Brown, J. Newmarch and E. Lewis, Trust Metadata: Enabling Trust and a Counterweight to Risks of E-Commerce, Asia Pacific World Wide Web Conference Proceeding, p. 197-203, Jan. 2000.

Y. Yang, L. Brown, J. Newmarch, Token of Trust: Different Certificates for Different Trust Models, UniForm'99 New Zealand Conference Proceedings, p. 29-44, Apr. 13-17, 1999.

* cited by examiner

*Primary Examiner*—Hosuk Song
*Assistant Examiner*—Nirav Patel
(74) *Attorney, Agent, or Firm*—Chen Yoshimura LLP

(57) ABSTRACT

A W3 Trust Model is described for evaluating trust and transitivity of trust of online services. By introducing a set of trust attributes for each web document, the W3 Trust Model combines a vertically trusted public key infrastructure with a horizontal referral web classification. It provides a mechanism to assess both the trust and the transitivity of trust of web contents in a heterogeneous environment. The trust attributes are categorized in three categories: a first category which relates to contents of the web document, a second category which relates to owner of the web document, and a third category which relates to relationships of the web document and certificate authorities. The method includes calculating a P value representing a standalone page trust assessment of the target web document based on trust attribute values in the first category, a Q value representing a standalone page trust assessment of the target web document based on trust attribute values in the second and third categories, and an S value representing a subordinate node assessment based on a total trust value and a relevance value R of each of a plurality of other web documents linked to the target web document. The P, Q and S values are then combined to calculate a total trust value of the target web document.

7 Claims, 1 Drawing Sheet

METHOD AND APPARATUS FOR EVALUATING TRUST AND TRANSITIVITY OF TRUST OF ONLINE SERVICES

CROSS-REFERENCE TO RELATED APPLICATIONS

This application claims priority under 35 U.S.C. §119(e) from U.S. Provisional Application Ser. No. 60/408,548, filed Sep. 5, 2002.

BACKGROUND OF THE INVENTION

1. Field of the Invention

This invention relates to evaluating trust and transitivity of trust of online services.

2. Description of the Related Art

Traditional trust relationships between business parties are based on legitimate physical identities such as shopfront. This physical manifestation is in contrast to an electronic commerce (eCommerce) environment on the Internet, where business providers and consumers identify each other by their web sites, email addresses or some electronic means such as a public key or certificate. These changes have brought about a new set of electronic threats and risks. Examples of such risks include fraud, misuse of personal data (e.g. credit card number), deliberate misinformation (e.g. the content of web documents), web spoofing (e.g. mimic legitimate businesses to unlawfully obtain consumers' credit card numbers), eavesdropping, identity theft, and repudiation. These risks represent elements of uncertainty in the eCommerce environment, which can produce financial losses and other undesirable results. As a result of these risks, there is an increasing awareness among web users of the issue of authenticity: of business partners, service providers and product information.

To limit or better deal with these elements of uncertainty, trust has been identified as an important concept in eCommerce. The trustworthiness of web documents is an increasing factor affecting the rate of growth of eCommerce. From an eCommerce perspective, trust can be seen as a counter-weight to elements of uncertainty. eCommerce trust can be tentatively defined as: a culturally (e.g. as in web communities) subjective view and perception (and expectation) of honesty and lawfulness by others. Different web communities may have different conceptual interpretations and definitions of trust. The meaning of trust in the context of eCommerce is still evolving along with the web environment and technologies.

Several public key infrastructure (PKI) trust models (such as X.509, PGP, SDSI/SPKI) have been developed, which involve digital signatures and other security services such as authentication, authorisation, access-control-list, privacy. The major industrially adopted PKI trust models are primarily hierarchically structured (e.g. X.509) to form a vertically trusted environment. However, in contrast to the hierarchical PKI trusted environment, most web documents are hypertext linked to form a horizontally (or web) referral environment. The nature of web documents requires an additional way to propagate trust from a parent (or root) web document to their signed or unsigned offspring web documents, giving rise to a heterogeneous trust environment on the Internet.

SUMMARY OF THE INVENTION

The present invention is directed to a W3 Trust Model that substantially obviates one or more of the problems due to limitations and disadvantages of the related art.

The present invention provides a method of evaluating trust of a target web document present in a web environment which comprises a plurality of web documents. The method includes: defining a plurality of trust attributes for the target web document, the plurality of trust attributes being categorized in a first category which relates to contents of the web document, a second category which relates to owner of the web document, and a third category which relates to relationships of the web document and certificate authorities; obtaining trust attribute values of at least some of the trust attributes; calculating a P value representing a standalone page trust assessment of the target web document based on trust attribute values in the first category; calculating a Q value representing a standalone page trust assessment of the target web document based on trust attribute values in the second and third categories; calculating an S value representing a subordinate node assessment, based on a total trust value and a relevance value R of each of a plurality of other web documents linked to the target web document; and calculating a total trust value of the target web document based on the P, Q and S values.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
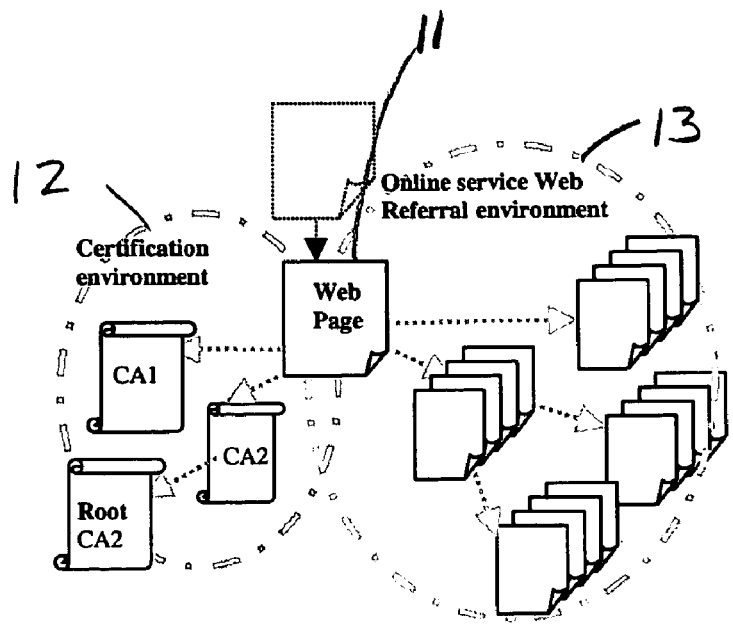
FIG. 1 is an overview of the trust evaluation environments of the W3 Trust Model according to an embodiment of the present invention.

This inventor has previously proposed a W3 Trust Model that bridges the gap or disconnection between a PKI environment and web referral environment. The proposed trust attributes (trust metadata) of the W3 Trust Model combines a vertically trusted Public Key Infrastructure (PKI) with a horizontally referral web environment. This model can provide an adequate trust environment and promote the transitivity of trust within its defined trust domain (i.e. web referral environment with a manageable number of nodes on the Internet).

In contrast to the PKI vertically trusted environment, horizontally referred web documents are the most common in a web environment. Typically, a certified (authentic) server only proves the authenticity of the server (e.g. web server), but does not prove web content information on the server. Also, in most cases, the communications between the server and client machines are not secure until web users agree to give their sensitive information such as credit card numbers. Thus, a certified server and the web information may be considered separate entities.

According to the proposed W3 Trust Model, trust information is implemented as metadata. Metadata is a simple way of providing information about a web resource, e.g. a web document. The main function of the trust metadata, i.e., a set of trust attributes, is to specify information regarding the trustworthiness of a web document. Preferably, the trust attributes cover different aspects of a web document are defined properly, i.e. sufficient information has to be extracted from all aspects of a web document in the heterogeneous web environment. Trust metadata may be relatively simple or relatively complicated depending on how it is defined; different beliefs and cultures may lead to different sets of trust attributes. On the web, the whole process of establishing trust must be done within a few seconds to be practical. In addition, the method of providing trust attributes (which form trust metadata) are preferably simple to implement and friendly to use.

Trust attributes are preferably designed to describe many aspects of a web document and the environment in which web documents reside. The trust metadata will assist better interpretation of individual trust attributes and provide meaningful information on the trustworthiness of a web document. There is a basic set of attributes, such as signed or unsigned web documents, and signed or unsigned servers (e.g. a web server). Based on the Dublin Core web resource descriptors, this inventor has proposed the following trust attributes to be used in Trusted W3 Model to describe a web document from the trust perspective. The objective of trust attributes is to provide information about not only the contents of a web document, but also ownership, and certification information. Trust attributes can be categorized into three groups as follows.

Category A: Web Object Content. This includes:

What it is about: Key words, Coverage, Description of sale information, Category, Title, Subject. Information about the web document can be divided into different categories, such as finance, education, entertainment, and news, etc. Some information has more serious consequences if it is misleading than others. And there may be less concern for trustworthiness if no action is required (e.g. purchase) after it is read. Trustworthiness may be related to fear of some kinds of risk, such as financial loss, or misused personal information (e.g. credit card numbers). So the attributes of Title, Subject, Keywords, Coverage, Description, Category, provide a reasonable description about a web document.

Where it comes from and operates: location, e.g. URL and DNS, Identifier, source of the document, and the language used, e.g. French (fr), Chinese (cn), Japanese (jp), English (en). These attributes indicate information which can identify and locate the web object (e.g. a web document).

When it is created: Create-Date. Often up-to-date information may be more credible than "old" (obsolete) information. On the other hand, it may also cause concern for someone because frequently changing information may be out of date when read.

How it was created: Process-Method, e.g. HTML hard coded web document and relevant information; CGI creates content elements of document.

Any conditions: rights, e.g. license issues, copy rights.

Category B: Relationship Between the Web Object and its Owner. This includes:

Who owns it: publisher, creator, contributor, organisation. If the web document is owned by an organisation rather than a person, it may carry more weight, because approval procedures from the organisation may filter out inaccurate information. Reputable organisations (big or small) may have better filters of known error information.

What kind organisation it belongs to: organisation type, e.g. gov, com, edu. In OECD countries, it is reasonable to assume that government departments (at least in Australia) have less intention to publicise misleading information and make a quick sale on the web. They give more weight to legality than some commercial organisations.

Who else it refers to: number of different URLs, i.e. Num-Diff-URL. The different URLs may cover more physical locations and have potential risks, such as suspect servers, obsolete information, questionable authoritative information and give rise to questions about whether the referral URLs (e.g. organisations and their servers) have similar policies and operational standards across the board.

Category C: Relationships Between the Web Object and the Certificate Authority (CA). This includes:

Whether the current (web) servers have been certified: Cert-Site. Although the certified server does not carry the same trust weight as the directly certified web document, it certainly helps to add extra trust weight to the web document.

What is the position in the hierarchical tree: Generation. The more close to the root CA, the less trust value might be lost by effect of fading factors.

Whether it has been certified: Cert-Docu. It is fair to give more trust weight to a signed document than a non-signed certified document.

When server/document has been certified: Cert-Date. This certified date may need to be compared with the create-date of the web document, which ensures that the web document has been re-certified after modification of a web document.

What type of Certificate: Cert-Type. A number of certificates may result from this attribute. Authors sometimes attach their own personal certificates, the server may have been issued one and a web document may also have one. The task is to give the highest trust weight to the most trusted and most relevant attributes, while not discarding others, but adding the extra trust weight to the total value.

Who is the CA: CA. This attribute indicates the issuing CA. The CA certified web server may be different from the CA certified web document. The latter may carry more weight of trust than the previous one, because of its direct relevance to the web information.

Whether the root CA is known: some commercial companies act as root CA to many subordinate CAs. Different CAs may certify different web documents which reside on the same server.

Where is the CA: Country, e.g. au, cn, br, fr, de. Each country has different legislation regarding recognition of digital signatures. OECD countries may have more uniform legal systems and policies then some other countries. More well defined legislation and defined legal systems may carry more trust weight than those who are not.

In addition to the above categories, certain general conclusions may be drawn about the trust value of a web document: (1) The shorter the hierarchical certification path, the less likely the trust value might be lost (i.e. there are fewer accumulated "fading factors"). (2) The same CA certifying both web documents and the server may have the highest trust value. (3) A certified web document with a non-certified server, and a certified server with non-certified web documents may be given different relative trust value. (4) A certified web document or server has higher trust value than a non-certified web document or server. (5) Some factors have been identified which may affect the trust value of a web document directly or indirectly through transitivity of trust.

The above-described trust attributes and factors are intended to cover a wide range of possible attributes in read-world applications. A particular trust model may include fewer or more attributes as desired. For example, some possible attributes not included in the above list include the number of different URLs that refer to the web document, and the number of visitors, which may tend to suggest that the web documents are trusted by many other web users. Moreover, these attributes are likely to evolve and be refined to enhance the trust metadata of a web document and to reflect changes of the heterogeneous web environment.

When one web document refers to another web document (i.e. two web-linked documents), issues of transferability of web document attributes arise. It is possible to assess and evaluate the trustworthiness of a newly referred web document by its parent web document. Transitivity of trust is an important concept for a trusted web environment. It allows a certain level of trust to travel to a defined number of nodes (i.e. domain). The trust metadata is a mechanism for implementing transitivity of trust. A web document has a number of dynamic links (or references) to other web documents and sites. Web documents themselves may be structured (linked) as web or hierarchical structures within a PKI trust model (either web or hierarchical structure). Consideration is given to transitivity of trust between different web documents. Each web document may consist of one or more web pages with a uniform URL, subject, and authorship. For example, the web document "www.xxx.edu.au/" is considered to be a different web document than "www.xxx.edu.au/~yany/". In other words, they do not have the same attributes of Author, Description, Subject, and URL, although have the same DNS information. These two web-linked documents might reside on different servers, maintained by different people. Therefore, the trust metadata may need to be re-assessed and reevaluated when changes occur to web documents.

Each trust attribute of a web document may or may not be the same when one web document refers to another. Based on their definitions, some attributes are transferable along with its trust value (e.g. if the same Author writes different web documents, which are linked, the weight trust of the attribute of Author remains the same). Some may not be transferable along with its trust value (e.g. two web documents do not have the same Identifier). Some may be partially transferable (e.g. a web document may be certified, which is also linked to a non-certified web document, but with the same Subject) although its trust value may reduce according to its conditions. Generally, transferable means the two web-linked web documents may have the same value of the attribute and have same weight of trust; non-transferable means the two web-linked web documents have different value of the attribute and may have different weight of trust, and the ID is restricted to non-transferable attributes; and partially transferable means some possible fading factors will reduce the weight of trust on the attribute or where two web-linked documents share some information with the same attributes.

When a web site refers to other sites, there are a number of fading factors in a heterogeneous environment. These fading factors represent those grey areas of organisational and operational responsibilities and elements of uncertainty from human and non-human causes. Some examples of fading factors include:

The complexity of CA policies: CA policies guide the operations of a CA. Any misinterpretation of CA policies or Certification Practice Statement (CPS) may also result in a loosening of the binding between a CA and its subordinates.

Formal vs. informal certification: some PKI trust models certify each other's keys and own keys (e.g. PGP). This informal certification may have less trust-value than formal hierarchical certification because of the complex legal binding provided by the hierarchical certification.

Certified vs. non-certified server: a non-certified server is typically given less weight of trust.

The position of the node within the hierarchical PKI structure: the distance to the Root Certification Authority. The further from the root CA, the less trust-value might be contained, i.e. the longer the chain, the more fading factors are accumulated, which might reduce the overall assessment of trust.

Changing management of an organisation: its current organisational and operational policies and procedures may be different from previous management.

Possible operational error: some errors may be caused by human and/or non-human efforts. The competence of employees might also be important for a CA's standards of compliance, or some disgruntled employees or contractors might commit fraudulent acts.

Some attributes are transferable along with its trust value (e.g. if the same Author wrote different web documents which are linked to each other, then the weight trust of the attribute of Author remains the same). Some may not be transferable along with its trust value (e.g. two web documents which do not have the same Identifier). Some may be partially transferable (e.g. a web server may be certified, which is also linked to a non-certified web server, but with the same Subject), so its trust value may be reduced according to its conditions.

For example, Bank A's web server has been certified by a trusted third party (i.e. a CA), but the server may refer to another web site which is not certified. This raises the issue of transitivity of trust, and the treatment depends on what trust attributes have changed from the certified site to the non-certified site. Based on this information, trust attributes may change their trust value. Once the overall trust value of a static web document has been calculated, it may have to be reassessed when a site is referred to. Therefore, the overall trust value may differ between these two servers.

These fading factors represent a hidden probability of risk. They may loosen the binding between linked sites, organisations or CAs. Therefore, the fading factors are preferably considered in assessing the transitivity of trust in a web referral environment.

The above descriptions, which provide a background for understanding the present invention, have been previously published such as in: [1] Y. Yang, L. Brown, J. Newmarch and E. Lewis, eCommerce Trust via the Proposed W3 Trust Model, the PACCS01Conference Proceedings, p 9-14, July 2001, Australia; [2] Y. Yang, L. Brown, J. Newmarch and E. Lewis, A Trusted W3 Model: Transitivity of Trust in a Heterogeneous Web Environment, the Fifth Australian World Wide Web Conference Proceedings, p 59-73, 18-20 Apr. 1999; [3] Y. Yang, L. Brown, J. Newmarch and E. Lewis, Trust Metadata: Enabling Trust and a Counterweight to Risks of E-Commerce, Asia Pacific World Wide Web Conference Proceeding, p 197-203, January 2000; and [4] Y. Yang, L. Brown, J. Newmarch, Token of Trust: Different Certificates for Different Trust Models, UniForm'99 New Zealand Conference Proceedings, p 29-44, 13-17 Apr. 1999. These publications are incorporated by reference herein in their entireties.

The present invention is directed to an improved W3 Trust Model (W3TM), which is also referred to the W3 Trust Model unless specifically distinguished from the model proposed earlier.

Figure 2:
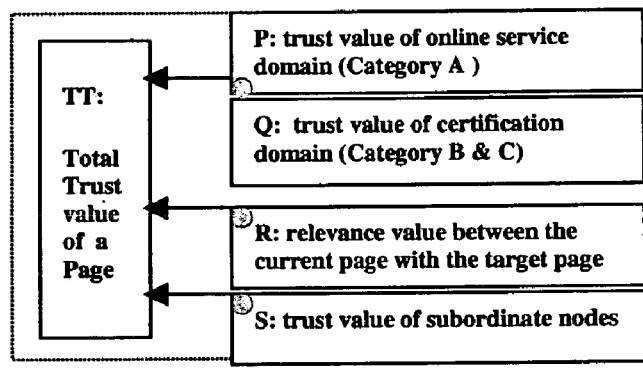
FIG. 2 illustrates the W3 Trust Model assessment components.

FIG. 1 is an overview of the trust evaluation environments of the W3 Trust Model according to embodiments of the present invention. The web page 11 represents an online service provider's web page, which is the starting point in the graph where trust value evaluation is required. The web page 11 is connected to a certification environment (or certification domain) 12 and an online service web referral environment (or service domain) 13. As schematically illustrated in FIG. 2, the total trust (TT) value of a targeted site (web page) is based on the result of recursive calculation of the component assessments P, Q, R and S. P denotes the values of calculation of a standalone page trust assessment for the service domain (i.e. category A), and Q denotes the values of calculation of a standalone page trust assessment for the certification domain (i.e. category B and C). R denotes the value of calculation of a relevance assessment among hyperlinked pages. S denotes the value of the calculation of a subordinate node assessment, which is the sum of "total trust" and "relevance" assessments of hyperlinked pages (i.e. child nodes) in the online service web referral domain. In other words, the total trust TT is the combination of the P value of the page, the S values (including associated R values), and the Q value for the certification domain. Total trust value of a targeted page is a combination of values of two domains including associated fading factors, the standalone-trust-value of the subordinate-value of the relevance tree:

P: Trust-value=combination of values of the trust metadata categories A

Q: Trust-value=the result of verification of the certification domain (i.e. the category B and C)

S: Subordinate-value=contribution to this page from children's total trust value and associated relevance-value (R) in the relevance-tree.

Each of the above components is now described in terms of general concepts, calculation restrictions, possible mathematical formulae, illustrative examples and some associated issues.

Standalone Trust Assessment

Standalone trust assessment indicates the trust analysis of a single page on a site. It does not analyse any contents of hyperlinked sites. Based on a standalone web page's content, trust assessment can be made by analysing three categories of trust metadata described earlier: Category A is the self-description of its own web content; Category B is the description of affiliation, compliance (i.e. the relationship-description of the web site with others); and Category C is the description of certification. These three categories of trust attributes are the building blocks of the W3 Trust Model and describe two environments in which an online service operates. Category A provides descriptive information about the online service web referral environment. Category B provides descriptive information about association, reputation, policies, and legal requirements. Category C provides the Public Key Infrastructure (PKI) certification environment. These three categories also are classified into two domains in the trust evaluation process framework. In other words, the standalone trust assessment is based on a parallel assessment of both domains; that is, the online service domain (P domain: category A) and the certification domain (Q domain: category B and C).

Online Service Domain

P is a numeric value derived from the trust metadata category A of a web page (standalone page) that represents the trust value of the service domain of the page. It looks at content such as metadata for keywords, but does not follow any hyperlinks. The value of P is calculated through a number of trust attributes of category A. The presence or absence of these attributes in category A determines the P value of the page. The following is an example:

$$P = \frac{\text{Number of attributes present}}{\text{Total number of attributes in category A}}$$

For example, a page U has five attributes of the sixteen defined in category A: Title, Keywords, Rights Publisher and Org-type. Using the above formula, the value is: P=5/16=0.31.

Certification Domain

Q is a numeric value that is derived from combination of professional affiliations (category B) and a chain of certificates (category C). Verification is required for all claims in the Q domain. Each attribute in the category B and C must be verified. Any false claim or absent attributes in either category will reduce the associated category's trust value. There is a fading factor associated with both category B and C.

In category B, attributes provide descriptive information in the areas of affiliation, reputation, policies and legal requirements. Each attribute must be verified, such as Professional-affiliations, External references, Customer protection policies and Services awards.

In category C, a chain of certificates (i.e. a special case of tree) is also known as "a chain of trust" in the X.509 standard. To construct a "valid certificate chain", a verification or confirmation process must be carried out for each "certification path" to its root certification authority. There are five attributes (e.g. certificate-Owner and Validity-period) for each certificate that must be verified to validate a certificate. For each valid certificate, a chain of trust (path to its root) to its issuer is constructed. In principle, the longer the path to the root CA, the more accumulation of fading factors. Each certificate carries a certain weight of trust value. This trust value will only be counted if the result of verification/checking is a positive result. A certificate seal (i.e. gif file) on a web site has no real trust value according to the W3 Trust Model. The validity check can be performed by matching certificate information on both sites, i.e. the certificate issuer's and the online service sites.

Figure 3:
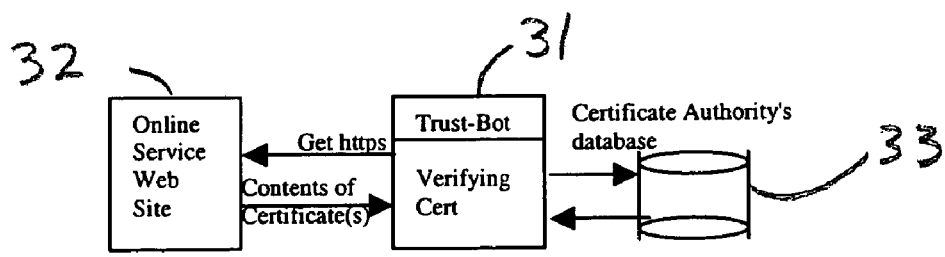
FIG. 3 schematically illustrates a verification process using a trust evaluation engine implementing the W3 Trust Model.

The positive and negative results of the verification process are used to calculate the category trust value. This verification process may be performed automatically using Trust-Bot, which is a trust evaluation engine implementing the W3 Trust Model. The verification process by the Trust-Bot is schematically illustrated in FIG. 3. As shown in FIG. 3, the Trust-Bot 31 receives the contents of certificate(s) from the online service web site 32, and communicates with the certificate authority's database 33 to verify the certificate(s).

A method for calculating the Q value includes verifying each piece of certificate information with the issuer site. The trust value may be decreased by non-confirmative/unverifiable claims if a maximum-trust model is used initially. A maximum-trust model sets the initial total trust value to 100% and then subtracting trust values from it according to the collected trust attributes. Otherwise, increase trust value if a zero-trust model is used as default. A zero-trust model sets the initial total trust value to 0% and then adding trust values to it according to the collected trust attributes. CAs reputations and length of path to the root CA determine trust weight and vary the value of Q. For example, a well-known CA carries a high trust rating; an unknown CA carries less trust rating; the longer the chain of certificates, the more cumulative fading factors. For category B, each attribute must be verified and add all positive results or deduct any false claim. For category C, a similar process as calculation of category B is carried out.

Some conditions or restrictions are imposed on category A (P value), B and C (Q value). They must be between 0 and 1. If one page U1 has a superset of attributes to another page U2, then the P value for U1 is higher than the P value for U2. That is, the more attributes, the better the P value. By the same principle, if one page U1 has positive results of claims (category B) and a valid PKI certificate (category C) and another page U2 does not, then the combination of Q value for U1 is higher than the Q value for U2. Having a valid PKI certificate improves the category C value.

The standalone trust value of each page will be carried out only on sites with unique domain name spaces. Alternatively, it is also possible to evaluate each page residing in the same domain space.

Relevance Assessments

The relevance assessment measures the "relevance" of online service(s) between a hyperlinked site with the targeted site. The result of this assessment is denoted as R. Each site has the attribute of "primary service" in category A. The targeted site's primary service acts as a benchmark for other sites to match up with. Certain general rules apply to relevance assessment: First, if the targeted site has defined a number of service(s) (e.g. dating service, restaurant, and hotel) and type of hyperlinks belongs to the category A (denoted as Cat-A external to/from links in W3TM), then each hyperlink site will be assessed for "relevance". It may be done by comparing primary service(s) attribute in the category A of both sites. Second, if a hyperlinked site's primary service attribute of category A is a subset of a primary service attribute of the targeted site, then this hyperlinked site may be tagged as a "relevant site". Further, each hyperlinked site must be identified by a unique domain name. This is to ensure that relevance assessment is only on unique (i.e. different) online service provider's web sites.

There are several existing methods and algorithms for relevance assessment and Internet search technologies, which may be used in the W3 Trust Model. Examples of such methods include such as WAIS, Connectivity-based ranking and hyperlink analysis. Some indicators of "relevance" and measuring techniques that can be used include:

Reversed hyperlink: Not only the targeted site has a hyperlink to another site, but the other site also has a reversed hyperlink to the targeted site and this reversed hyperlink is compliant with certain conditions, e.g. the hyperlinked sites and currently evaluated site do not reside at the same domain name space and with different authors. For example, the URL of www.online-service.com is considered the same domain space as the URL of www.online-service.com/dating—and so does not count.

Trusted Third Party (TTP): An authority provides information that the hyperlinked sites are "relevant" to the currently evaluated site. TTP could be the bureau of dating service, which has a registered online dating service listing the URLs of www.find-a-partner.com and www.online-dating.net. This indicates the URL www.find-a-partner.com is related to online dating services. Therefore it is "relevant" to the currently evaluated web site of www.online-dating.net.

Semantic analysis to determine "relevance": A way to identify synonyms between hyperlinked sites (i.e. the targeted site and a site that is hyperlinked from the targeted site).

Web content analysis: Based on matching sub-set of trust attributes with the starting page to determine the current page's relevance to the starting page (e.g. the Primary Service attribute in category A). Some Z39.50 information retrieval functions may have potential for content analysis by retrieving hyperlinked web information from a trust-metadata-base server of TTP (Trusted Third Party), which stores the results of recent analysis.

A pre-defined set of "relevant-services": Predefined "relevant-services" in the metadata of the starting page flags all relevant services, e.g. dating service including restaurant, hotel and travel hyperlinked sites. An industry classification system could be utilised for relevance assessment.

Metadata information: For each classified hyperlinked site (e.g. Cat-A external link in W3TM), the "relevance" could be flagged in the Relevance metadata, e.g. Relevance=Yes. Then each flagged site will be evaluated and its the total trust value will be accounted for. Any irrelevant hyperlinked sites may or may not attract negative results depending on the selected algorithm.

By matching "relevance attributes" between the targeted web site and the hyperlinked web site, a relevance assessment may be carried out. An example is illustrated below. First, follow each identified external link of the targeted site (e.g. Cat-A external link of category A of W3TM). Then, compare the "primary services" attributes between the targeted and hyperlinked sites and ensure both domain names are unique. If the hyperlinked site's primary service attribute (e.g. hotel) is a subset of the targeted site's primary services (e.g. dating service, restaurant and hotel), then this hyperlinked site is tagged as "relevant" and is recruited to the relevance-tree. The relevance value R may be defined as the number of elements in the intersection of the two sites' attributes divided by the hyperlinked site's total number of attributes in Primary Services. For example, if the hyperlinked site's primary service attribute has 5 online services (i.e. dating, hotel, restaurant, gambling and entertainment) and the targeted site's primary service attribute has 3 services (dating, hotel restaurant), the common/shared attributes are 3 services. The relevance value may be calculated as 3/5=0.6. That is, the R has "relevancevalue" of 60%. If the relevance-value is greater than or equal to 50%, then the hyperlinked site may be recruited to the relevance-tree. R must be between 0 and 1. Certain attributes in categories A (e.g. Location, Source, Publisher, company legal registration number) may be required to be different when assessing "relevance" between two pages.

Subordinate Assessment

S is a numeric value denoting a "subordinate assessment". A targeted page often has hyperlinked pages (sites). These hyperlinked sites could be named as "children" nodes of the parent. A child node is said to be a "subordinate node" of its parent node. Subordinate assessment is trust assessment of hyperlinked child nodes. The result of the assessment is denoted as S. A web page may have a number of child nodes, which also have their own child nodes. The parent can have child and grandchild nodes. The structure of the family among parent, children and grandchildren may be denoted as a graph structure. This graph then is pruned to a tree structure.

The value of S is calculated based on the total trust value TT of child node and the associated relevance value of the child node (R), and weighted by the total number of children. The following is an example formula for S. In general, S equals the sum of the combination of the total trust value of children (TT_child) and the relevance values (R_child) of direct-subordinate nodes; that is, $$S = \Sigma(TT\_child \times R\_child)/(\text{no. of children})$$

This formula indicates that fewer children tend to result in higher S value. For example, if a parent node has one child node, the total trust value of the child node is 0.7 and the R value for the child node is 0.5, then the S value of the parent node is S=(0.7×0.5)/1=0.35. In general, the S value will take total trust value contributions from immediate subordinate nodes and associated R values. The S value must be between 0 and 1.

Total Trust Value (TT)

TT is the total trust value of each page in the relevance tree. The top node TT is based on TT of each page. TT is calculated by combining values of P, Q and S of the targeted site and associated subordinate nodes in the relevance-tree and normalising the result. Thus, the value of TT is not only based on the standalone page's trust assessment, but also takes account of the "subordinate assessment" of all hyperlinked pages. One special case is the overall trust value of the top node, i.e. the targeted site where trust evaluation is required. It is also known as a root node of a relevance-tree in the trust evaluation process.

The value of TT may be found by recursion. TT is a site-based evaluation on the trust value of each hyperlinked site. The calculation includes collecting the trust metadata of all categories for each site and calculating the three trust categories, weighting and assigning a score to each category, and combining all values according to an appropriate formula to form the total trust value of the currently evaluated page. Use of different formulae may result in different TT values, but TT must be between 0 and 1. An example of a formula is TT=(P+Q+S)/3. Different formulae may be developed based on different theories to calculate the total trust value of a page (TT) and combine the values P, Q, S of subordinate nodes. Different methods or formulae may also be used in initialisation, weighting and combining of trust attributes. For example, the following illustrates options for initialising trust values for 16 trust attributes in category A:

a. Total number of present attributes of a page is divided by the total number of benchmarked attributes; or
b. Total-Category-Value (95%) is divided by the number of trust attributes. This will give each trust attribute a non-discriminatory equal value; or
c. Divide 16 trust attributes into 3 sub-categories, such as critical, important and trivial Each sub-category then has been assigned a portion of the total trust value for category A (i.e. 80%); or
d. 16 trust attributes are given an individual initial value according to the customer's assessment criteria.

Once the assessment process is finished, the trust metadata-base is updated and consumers will be informed. There are a number of possible ways to present and store the final result of trust assessments, including numeric format, text format, table, diagram and the trust-metadata-base.

The improved W3 Trust Model described above provides a mechanism for the evaluation of trust and transitivity of trust through carefully constructing a trust metadata tree using online service "relevance" assessments, verifying certificate(s) and combining the calculated values. In addition to the examples described in this specification, other specific models or formulae, as well as general guidelines and standards that may be used with the W3 Trust Model may be developed based on case studies.

The W3 Trust Model according to embodiments of the present invention may be implemented in software executed by a computer, and may be implemented by a provider of web access services, a provider of web searching services, a provider of web page trust evaluation services, or a provide of other web services, as well as by individual web users.

It is recognized that the implementation of a W3 Trust Model according to embodiments of the present invention depends on online service providers' web contents being compliant with a metadata standard. Given the wide use of XML in the eCommerce environment, the potential benefits of using XML and RDF may be explored for standardising trust metadata.

This specification uses various terms such as "web document", "web object", "web page", "web site", etc. to refer to a collection of information present on the web or other network. Because pieces of information on the web are organized into a structure having different levels and often linked with each other by referrals, any of the above terms may be used to refer to a particular collection of information. These terms should be understood as interchangeable unless specific distinctions are made in specific contexts.

It will be apparent to those skilled in the art that various modification and variations can be made in the W3 Trust Model of the present invention without departing from the spirit or scope of the invention. Thus, it is intended that the present invention cover modifications and variations that come within the scope of the appended claims and their equivalents.

What is claimed is:

1. A method of evaluating trust of a target web document present in a web environment which comprises a plurality of web documents, the method comprising:

defining a plurality of trust attributes for the target web document, the plurality of trust attributes being categorized in a first category which relates to contents of the web document, a second category which relates to owner of the web document, and a third category which relates to relationships of the web document and certificate authorities;

obtaining trust attribute values of at least some of the trust attributes;

calculating a P value representing a standalone page trust assessment of the target web document based on trust attribute values in the first category;

calculating a Q value representing a standalone page trust assessment of the target web document based on trust attribute values in the second and third categories;

calculating an S value representing a subordinate node assessment, based on a total trust value and a relevance value R of each of a plurality of other web documents linked to the target web document;

calculating a total trust value of the target web document based on the P, Q and S values; and displaying the calculated total trust value of the target web document to a web user or storing the calculated total trust value of the target web document in a database.

2. The method of claim 1, wherein the trust attribute values for the target web document are provided as metadata.

3. The method of claim 1, wherein the P value is calculated as the ratio of the number of trust attributes in the first category present in the target web document to the total number of trust attributes defined in the first category.

4. The method of claim 1, wherein the step of calculating the Q value includes verifying each trust attribute in the second and third category present in the target web document.

5. The method of claim 1, wherein the relevance value R is calculated based on trust attribute values of the target web document and other web documents linked to the target web document.

6. The method of claim 1, wherein the other web documents are referenced by the target web document, and wherein the S value is calculated by averaging the total trust value of all of the other web documents weighted by the associated relevance values.

7. The method of claim 1, further comprising:

transferring all or some of trust attributes and their values of the target web document to a second target web document.

* * * * *